(12) United States Patent
Tsujita

(10) Patent No.: US 9,971,717 B2
(45) Date of Patent: May 15, 2018

(54) BUS INTERFACE CIRCUIT

(71) Applicant: KABUSHIKI KAISHA TOSHIBA, Tokyo (JP)

(72) Inventor: Taketoshi Tsujita, Fujisawa Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 249 days.

(21) Appl. No.: 14/635,897

(22) Filed: Mar. 2, 2015

(65) Prior Publication Data
US 2016/0077990 A1 Mar. 17, 2016

(30) Foreign Application Priority Data
Sep. 17, 2014 (JP) .................................. 2014-189159

(51) Int. Cl.
G06F 13/00 (2006.01)
G06F 13/362 (2006.01)
G06F 13/42 (2006.01)

(52) U.S. Cl.
CPC .......... *G06F 13/3625* (2013.01); *G06F 13/42* (2013.01)

(58) Field of Classification Search
None
See application file for complete search history.

(56) References Cited

U.S. PATENT DOCUMENTS

| 5,889,817 | A | 3/1999 | Yoshida |
| 6,799,233 | B1 | 9/2004 | Deshpande et al. |
| 7,685,449 | B2 | 3/2010 | Terasawa |
| 2008/0201588 | A1* | 8/2008 | Pyeon ............... G11C 19/00 713/320 |

(Continued)

FOREIGN PATENT DOCUMENTS

| JP | H10028150 A | 1/1998 |
| JP | 2000059410 A | 2/2000 |

(Continued)

OTHER PUBLICATIONS

Japan Office Action dated Jun. 2, 2017, filed in Japan counterpart Application No. 2014-189159, 9 pages (with translation).

*Primary Examiner* — Idriss N Alrobaye
*Assistant Examiner* — Richard B Franklin
(74) *Attorney, Agent, or Firm* — Patterson & Sheridan, LLP

(57) ABSTRACT

According to an embodiment, a bus interface circuit disposed in each of a plurality of slave devices to which a common data channel and a clock channel are supplied from a master device includes a head information detection circuit, an inner clock control circuit, and a data analyzing circuit. The head information detection circuit detects head information from the data channel indicating a head of the data from the data channel, destination information indicating a destination of the data, and a data body in this order. The data analyzing circuit is synchronized with the inner clock generated from the clock control circuit after the head information is detected, and detects the destination information from the data channel, and then analyzes the data body. The inner clock control circuit stops the inner clock when the destination information does not match the destination information of the bus interface circuit.

20 Claims, 7 Drawing Sheets

(56) References Cited

U.S. PATENT DOCUMENTS

2013/0198427 A1    8/2013  Leitner et al.

FOREIGN PATENT DOCUMENTS

| JP | 2007282186 A | 10/2007 |
| JP | 2009244991 A | 10/2009 |
| JP | 4918866 B2 | 4/2012 |
| WO | 2006090473 A1 | 8/2006 |

* cited by examiner

| INPUT | | | | OUTPUT | |
|---|---|---|---|---|---|
| CLRN | PRN | D | CK | Q | QN |
| L | H | X | X | L | H |
| H | L | X | X | H | L |
| L | L | X | X | H | H |
| H | H | L | ↑ | L | H |
| H | H | H | ↑ | H | L |
| H | H | X | ↓ | Qn | QNn |

BUS INTERFACE CIRCUIT

CROSS-REFERENCE TO RELATED APPLICATION

This application is based upon and claims the benefit of priority from Japanese Patent Application No. 2014-189159, filed Sep. 17, 2014, the entire contents of which are incorporated herein by reference.

FIELD

Embodiments described herein relate generally to a bus interface circuit.

BACKGROUND

A control circuit including one master device and a plurality of slave devices which are connected to each other by a bus is known. Each of the master device and the slave device includes a bus interface circuit. The master device writes data to a register in any slave device through the bus interface circuit. The control circuit controls a specific device according to the data written on the corresponding register. It is preferable that current consumption and noise of the bus interface circuit be reduced.

DETAILED DESCRIPTION

An example embodiment of a bus interface circuit provides reduced current consumption and noise.

In general, according to one embodiment, a bus interface circuit that is disposed in each slave device of a plurality of slave devices to which a common data channel and a clock channel are supplied from a master device. The bus interface circuit includes a head information detection circuit, an inner clock control circuit, and a data analyzing circuit. The head information detection circuit is configured to detect head information from the data channel The data analyzing circuit is configured to detect destination information which indicates a destination of data from the data channel, and then a data body following the destination information. The inner clock control circuit is configured to output an inner clock signal synchronized with the clock channel signal after the head information is detected. The data analyzing circuit is synchronized with the inner clock signal after the head information is detected, and is configured to synchronously detect the destination information, and then analyze the data body. The inner clock control circuit is configured to stop outputting the inner clock signal when the destination of the destination information does not match the destination information of the bus interface circuit.

Hereinafter, example embodiments are described with reference to the drawings. The present disclosure is not limited to the example embodiments.

(First Embodiment)

Figure 1:
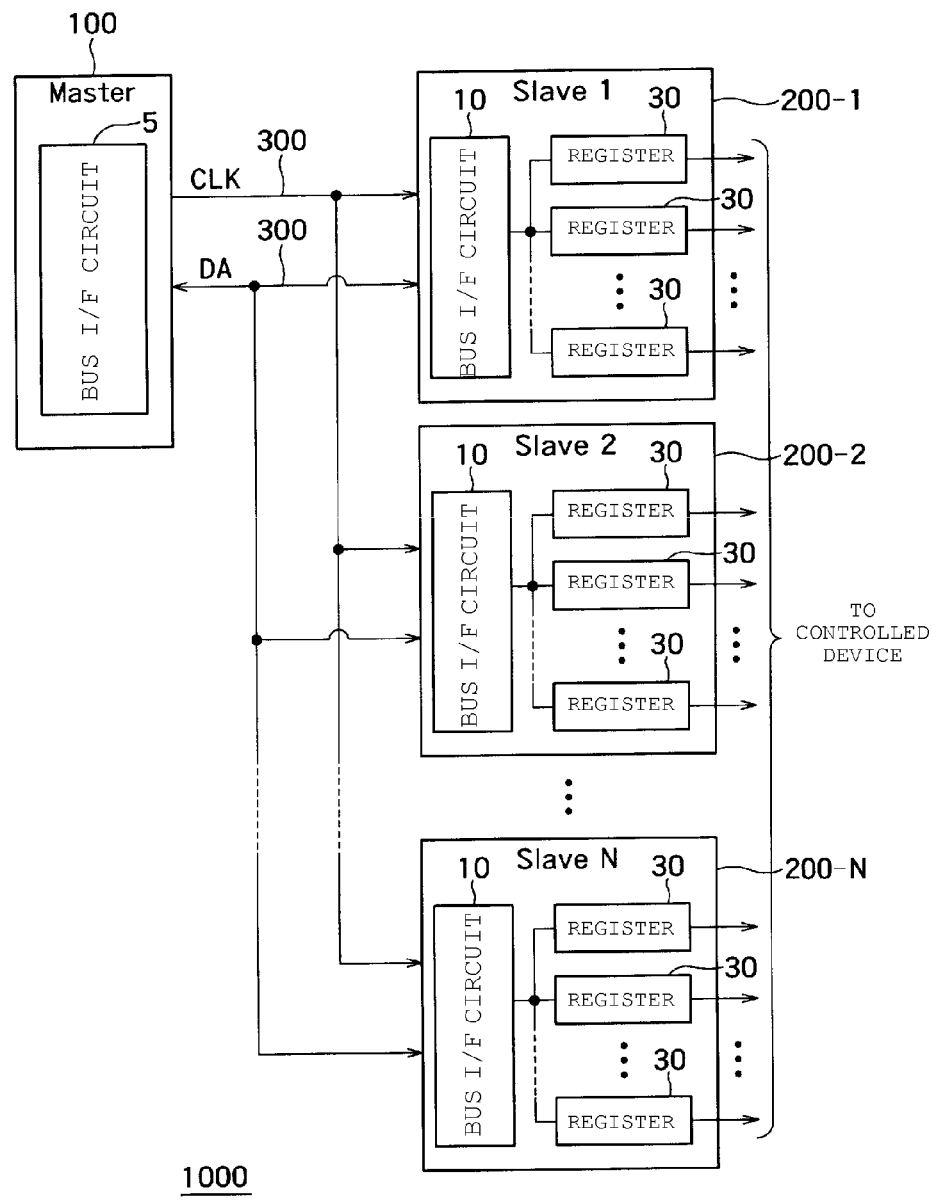
FIG. 1 is a block diagram illustrating a schematic configuration of a control circuit according to a first embodiment.

FIG. 1 is a block diagram illustrating a schematic configuration of a control circuit 1000 according to a first embodiment. As illustrated in FIG. 1, the control circuit 1000 includes a master device 100, and a plurality of slave devices 200-1 to 200-N (N is an integer greater than or equal to 2) which is connected to the master device 100 by a bus 300. A data channel DA and a clock channel signal CLK are supplied from the master device 100 to the plurality of slave devices 200-1 to 200-N through the bus 300.

The master device 100 includes a bus interface circuit 5 connected to the bus 300. Each of the plurality of slave devices 200-1 to 200-N includes a bus interface circuit 10 connected to the bus 300. Each of the plurality of slave device 200-1 to 200-N also includes a plurality of registers 30 connected to the bus interface circuit 10. In this first embodiment, the bus interface circuits 5 and 10 are based on an interface standard (RF Front-End (RFFE)) established by a Mobile Industry Processor Interface (MIPI) alliance.

The plurality of registers 30 is connected to a controlled device (not specifically illustrated). The controlled device is controlled according to data retained in the plurality of registers 30.

The control circuit 1000 is, for example, disposed in a high frequency transmission and reception circuit of mobile equipment such as a smart phone, and may control an operation of the high frequency transmission circuit and/or reception circuit. In this example, the controlled device includes circuits in the high frequency transmission circuit and the reception circuit.

Each of the plurality of slave devices 200-1 to 200-N has substantially the same configuration, and hereinafter, a configuration of one slave device 200-1 is described as an exemplar for the other slave devices 200-2 to 200-N.

Figure 2:
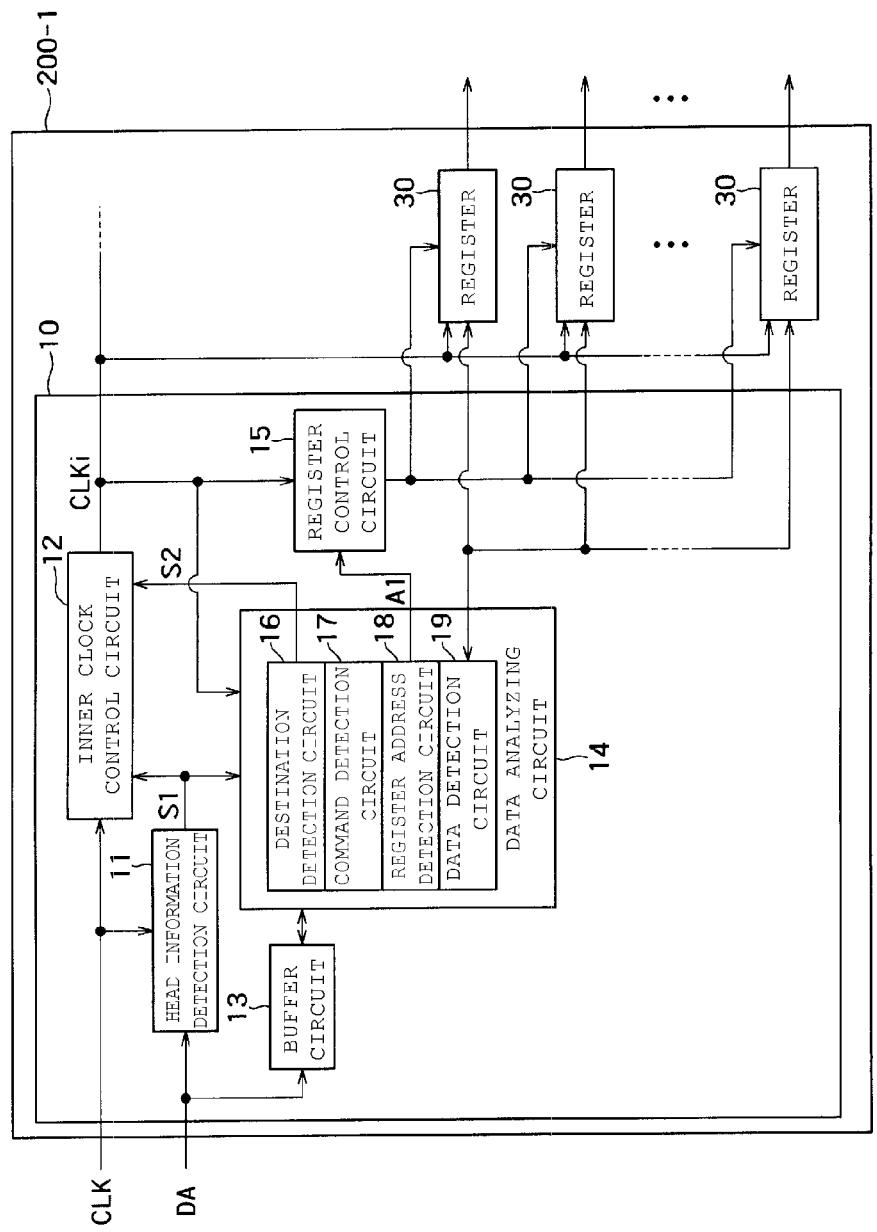
FIG. 2 is a block diagram illustrating a schematic configuration of a bus interface circuit of a slave device in FIG. 1.

FIG. 2 is a block diagram illustrating a schematic configuration of the bus interface circuit 10 of the slave device 200-1 in FIG. 1. As illustrated in FIG. 2, the bus interface circuit 10 includes a head information detection circuit 11, an inner clock control circuit 12, a buffer circuit 13, a data analyzing circuit 14, and a register control circuit 15.

Data from the data channel DA may include head information indicating a head (start point) of data on the data channel DA, destination information indicating a destination for data on the data channel DA, and a data body (e.g., a data block) in this order. The destination of data from the data channel DA is at least any one of the slave devices 200-1 to 200-N, that is, at least any one of N bus interface circuits 10 of the slave devices 200-1 to 200-N. Hereinafter, explanation is provided such that an intended data destination is the slave device 200-1, thus this means that the destination is the bus interface circuit 10 of the slave device 200-1. However, the possible destinations are, of course, not limited the bus interface circuit of the slave device 200-1

The destination may be any one of the slave devices 200-1 to 200-N. The destination may include a plurality of slave devices among the slave devices 200-1 to 200-N (a subset of the slave devices 200-1 to 200-N). The destination can also include all of the slave devices 200-1 to 200-N.

The data body includes a command, for example, instructing writing, reading, or the like, and then a register address designating one or more of the registers 30, and then data to be written in the one or more registers 30 when the command is a command instructing data writing. Additionally, when the command is a data reading instruction, the data included in the data body can be data read from the register 30, and used by the master device 100. That is, the data included in the data body can be supplied from the master device 100 to the slave devices 200-1 to 200-N, and can be supplied from any one of the slave devices 200-1 to 200-N to the master device 100.

The head information detection circuit 11 detects the head information from the data channel DA, and outputs a head identification signal S1 indicating whether or not the head information is detected.

The inner clock control circuit 12 outputs an inner clock signal CLKi which is synchronized with the clock channel signal CLK based on the head identification signal S1 output after the head information is detected.

The buffer circuit 13 buffers the data from data channel DA and supplies the buffered data to the data analyzing circuit 14.

The data analyzing circuit 14 is synchronized with the inner clock signal CLKi based on the head identification signal S1 after the head information is detected, then detects the destination information from data on the data channel DA, and then analyzes the data body of data supplied on the data channel DA. When the inner clock signal CLKi is not supplied, the data analyzing circuit 14 does not operate.

Specifically, the data analyzing circuit 14 includes a destination detection circuit 16, a command detection circuit 17, a register address detection circuit 18, and a data detection circuit 19.

The destination detection circuit 16 detects the destination information from data on the data channel DA, and outputs a destination identification signal S2 indicating whether or not the destination of the destination information matches the destination of the slave device 200-1.

The command detection circuit 17 detects the command from the data on the data channel DA.

The register address detection circuit 18 detects the register address from data on the data channel DA, and outputs the control signal A1 in accordance with a detection result.

When the command is a write command, the data detection circuit 19 detects data from the data channel DA, and outputs the detected data to the one or more registers 30.

In addition, when the command is a read command, the data detection circuit 19 reads data from one or more of the registers 30 in accordance with the register address, and outputs the read data to the buffer circuit 13. In this case, the buffer circuit 13 buffers the data, and supplies the data to the master device 100 through the bus 300.

The register control circuit 15 is synchronized with the inner clock signal CLKi based on the control signal A1, and performs the writing or the reading with respect to any one of the registers 30 in accordance with the register address.

The one or more registers 30 designated by the register control circuit 15 is/are subjected to the writing or the reading by being synchronized with the inner clock signal CLKi.

Here, when the destination of the destination information does not match the slave device 200-1, the inner clock control circuit 12 stops the output of the inner clock signal CLKi based on the destination identification signal S2. On the other hand, when the destination of the destination information matches the destination of the slave device 200-1, the inner clock control circuit 12 maintains the output of the inner clock signal CLKi. The inner clock control circuit 12 restarts the output of the inner clock signal CLKi when the head of the data is received as indicated by the head identification signal S1 after the output of the inner clock signal CLKi has been stopped.

Figure 3:
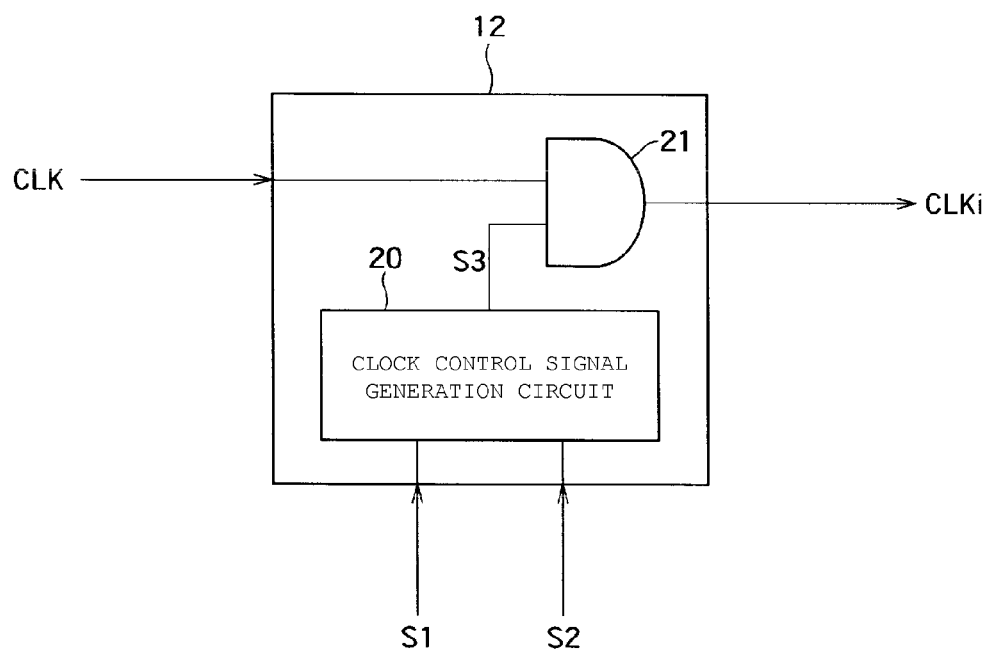
FIG. 3 is a block diagram illustrating an example of a configuration of an inner clock control circuit in FIG. 2.

FIG. 3 is a block diagram illustrating an example of a configuration of the inner clock control circuit 12 in FIG. 2. As illustrated in FIG. 3, the inner clock control circuit 12 includes a clock control signal generation circuit 20, and an AND circuit 21. The clock control signal generation circuit 20 outputs a clock control signal S3 according to the head identification signal S1 and the destination identification signal S2. The AND circuit 21 outputs logical 'AND' of the clock channel signal CLK and the clock control signal S3 as the inner clock signal CLKi.

Figures 4A, 4B:
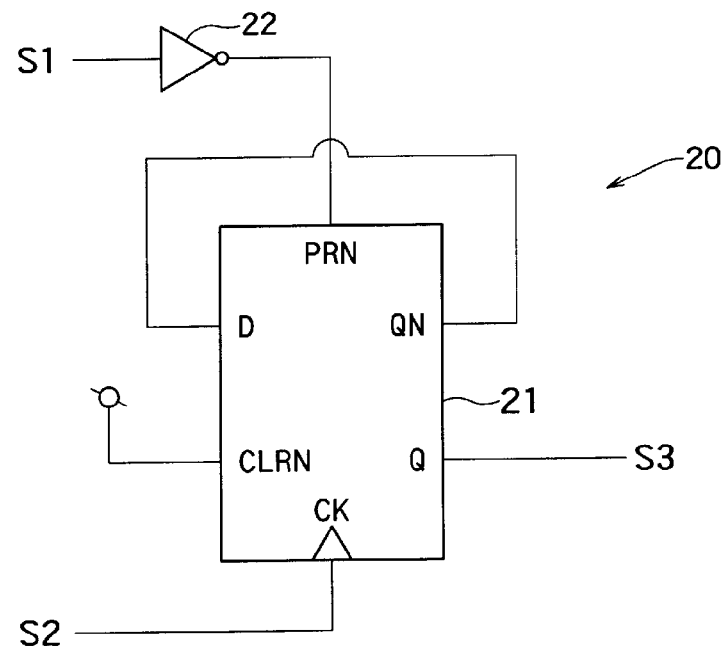
FIG. 4A is a block diagram illustrating an example of a configuration of a clock control signal generation circuit in FIG. 3.
FIG. 4B depicts a truth table of a flip-flop circuit in FIG. 4A.

FIG. 4A is a block diagram illustrating an example of a configuration of the clock control signal generation circuit 20 in FIG. 3. As depicted in FIG. 4A, the clock control signal generation circuit 20 includes a flip-flop circuit 21 and an inverter 22.

The flip-flop circuit 21 is a D-type flip-flop circuit having a preset function and a clear function. In the flip-flop circuit 21, a power supply voltage is supplied to an inversion clear terminal CLRN, and the head identification signal S1 is inverted by the inverter 22, which is supplied to an inversion preset terminal PRN. In addition, the destination identification signal S2 is supplied to a rising edge-triggered, for example, clock terminal CK, a signal from an inverse output terminal QN is supplied to an input terminal D, and the clock control signal S3 is output from an output terminal Q.

FIG. 4B depicts a truth table of the flip-flop circuit 21 in FIG. 4A. As illustrated in FIG. 4B, for example, when the head identification signal S1 is HIGH (logical "1"), the inversion preset terminal PRN is LOW (logical "0"), and thus the clock control signal S3 of the output terminal Q is HIGH. In addition, in a case where the head identification signal S1 is LOW (PRN of the flip-flop is HIGH), and the clock control signal S3 is HIGH (D input is LOW), when the destination identification signal S2 switches from LOW to HIGH, the clock control signal S3 of the output terminal Q switches to LOW. If the clock terminal CK is changed from HIGH to LOW, the clock control signal S3 of the output terminal Q is unchanged.

Next, an operation of the bus interface circuit 10 is described with reference to a timing diagram of FIG. 5.

Figure 5:
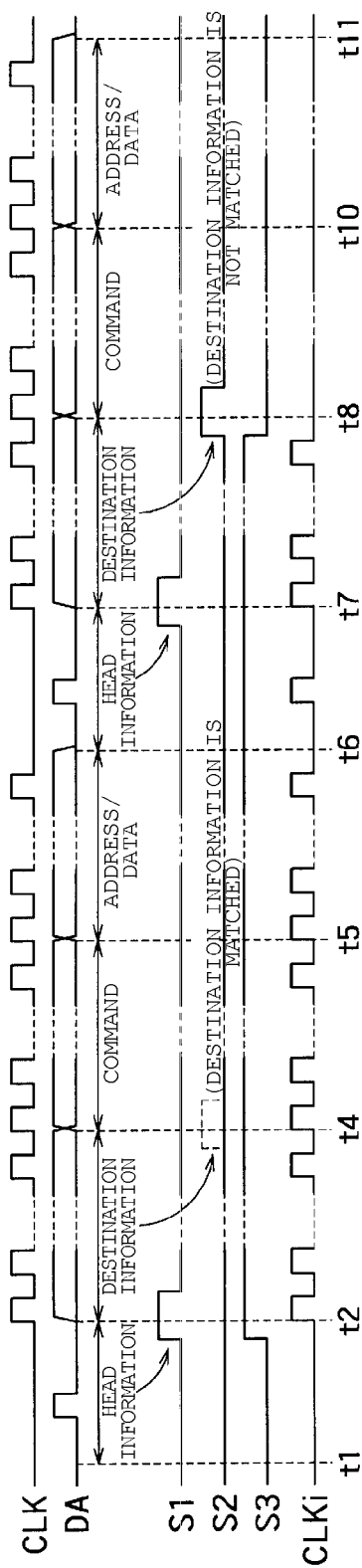
FIG. 5 is a timing diagram illustrating the bus interface circuit of the slave device in FIG. 2.

FIG. 5 is a timing diagram of the bus interface circuit 10 of the slave device 200-1 in FIG. 2. As illustrated in FIG. 5, an initial data (first data) on the data channel DA is supplied to each of the bus interface circuits 10 of the slave devices 200-1 to 200-N during a time period from time t1 to time t6, and then the next data (second data) on the data channel DA is supplied during a time period from time t6 to time t11. Even though it is not illustrated, the subsequent data on the data channel DA is supplied after time t11. Thus, a plurality of data from the data channel DA is sequentially supplied to each of the bus interface circuits 10 of the slave devices 200-1 to 200-N. In an illustrated example, a destination of the initial data is the slave device 200-1, and a destination of the next data is a slave device other than the slave device 200-1.

In the illustrated example, at time t1, the head identification signal S1, the destination identification signal S2, and the clock control signal S3 are LOW. Accordingly, the inner clock signal CLKi is also LOW and not running.

In a period from time t1 to time t2, the head information from the data channel DA is supplied for the initial data. In the illustrated example, the head information includes a pulse, which returns to LOW after being changed from LOW to HIGH. In addition, in this period, the clock channel signal CLK is LOW.

Since the clock channel signal CLK is LOW, and data on the data channel DA includes the pulse, the head information detection circuit 11 determines that the head information is detected, allows the head identification signal S1 to be changed from LOW to HIGH, and returns the head identification signal S1 to LOW after a predetermined period.

After time t2, the clock channel signal CLK runs, alternately repeating HIGH and LOW at a predetermined frequency until time t6.

When the head identification signal S1 is HIGH, the clock control signal generation circuit 20 inputs LOW to the inversion preset terminal PRN, causing the clock control signal S3 to switch HIGH on the output terminal Q. Accordingly, the inner clock control circuit 12 enables the inner clock signal CLKi which is synchronized with the clock channel signal CLK after time t2.

The destination detection circuit 16 is synchronized with the inner clock signal CLKi and detects the destination information from the data channel DA, and if the destination of the destination information matches the destination of the slave device 200-1, and the destination identification signal S2 is maintained at LOW. Accordingly, the clock control signal generation circuit 20 maintains the clock control signal S3 at HIGH and the inner clock control circuit 12 maintains the output of the inner clock signal CLKi. During a period from time t4 to time t5, the command detection circuit 17 is synchronized with the inner clock signal CLKi, and detects the command from the data channel DA. After that, during a period from time t5 to time t6, the register address detection circuit 18 is synchronized with the inner clock signal CLKi and detects the register address from the data channel DA, and the data detection circuit 19 is synchronized with the inner clock signal CLKi and performs processing in accordance with the command as described above.

During a period from time t6 to time t7, the head information of the next data (second data) on the data channel DA is supplied. Similar to the period from time t1 to time t2, the head information detection circuit 11 determines that the head information is detected, allows the head identification signal S1 to be changed from LOW to HIGH, and returns the head identification signal S1 to LOW after a predetermined period.

After time t7, the destination detection circuit 16 is synchronized with the inner clock signal CLKi, and detects the destination information from the data on the data channel DA. Because the destination of the destination information does not match the slave device 200-1, the destination identification signal S2 is changed from LOW to HIGH, and returns to LOW after a predetermined period. Accordingly, because the signal input to the inversion preset terminal PRN is HIGH, and the destination identification signal S2 input to the clock terminal CK is changed from LOW to HIGH, the clock control signal generation circuit 20 causes the clock control signal S3 to be changed from HIGH to LOW. Accordingly, the inner clock control circuit 12 stops the output of the inner clock signal CLKi. During a period from time t8 to time t11, the inner clock signal CLKi is not supplied, and thus the data analyzing circuit 14 does not operate.

As described above, according to this embodiment, when the destination from the data channel DA does not match the slave device, the output of the inner clock signal CLKi is stopped. That is, when the destination does not match the slave device, the inner clock signal CLKi is not supplied to the data analyzing circuit 14 and the register control circuit 15, and thus the data analyzing circuit 14 and the register control circuit 15, which are operated by being synchronized with the inner clock signal CLKi, do not operate. Accordingly, it is possible to reduce current consumption and noise of the data analyzing circuit 14 and the register control circuit 15. That is, it is possible to reduce current consumption and noise of the bus interface circuit 10.

For example, when the control circuit 1000 is disposed in the high frequency transmission and reception circuit of the mobile equipment, it is possible to reduce current consumption of the mobile equipment, and it is possible to inhibit a high frequency property of the mobile equipment from being degraded due to noise generated from the bus interface circuit 10.

Comparative Example

Here, a bus interface circuit 10X according to a comparative example is described.

Figure 7:
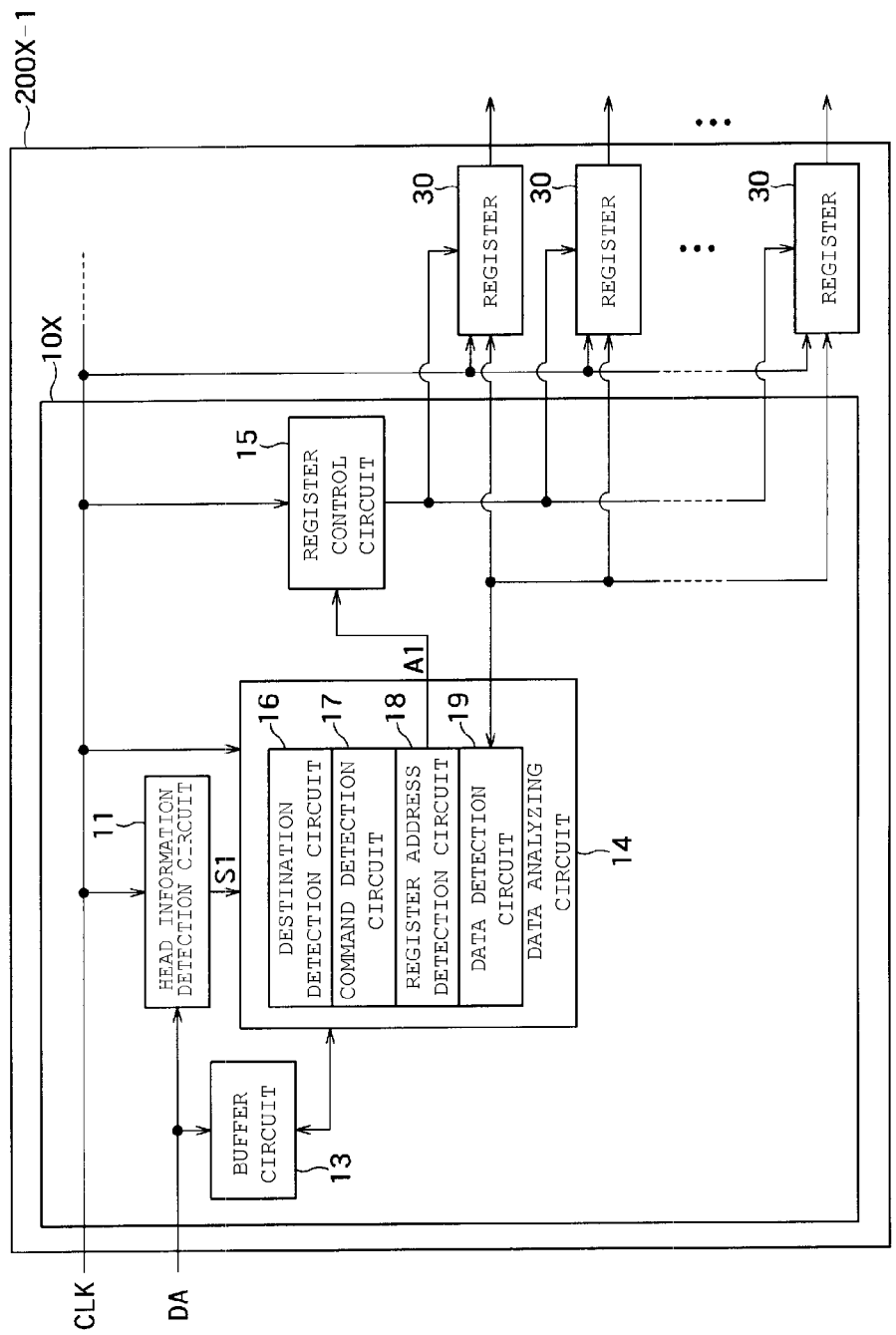
FIG. 7 is a block diagram illustrating a schematic configuration of a bus interface circuit of a slave device according to a comparative example.

FIG. 7 is a block diagram illustrating a schematic configuration of the bus interface circuit 10X of a slave device 200X-1 according to the comparative example. As illustrated in FIG. 7, the bus interface circuit 10X does not include the inner clock control circuit 12 according to the first embodiment. Accordingly, even when the destination of the data from the data channel DA is not a selected slave device, the input of the clock channel signal CLK to the data analyzing circuit 14 and the register control circuit 15 of the interface circuit 10X of the unselected slave devices 200X-1 is continued. For this reason, a current continues to periodically flow through the data analyzing circuit 14 and the register control circuit 15 which are configured with a digital circuit operating according to the clock channel signal CLK. Therefore, power consumption increases. In addition, the data analyzing circuit 14 and the register control circuit 15 through which the current continues to periodically flow are noise generation sources.

(Second Embodiment)

A second embodiment is different from the first embodiment in that a data control circuit 13a is included instead of the buffer circuit 13.

Figure 6:
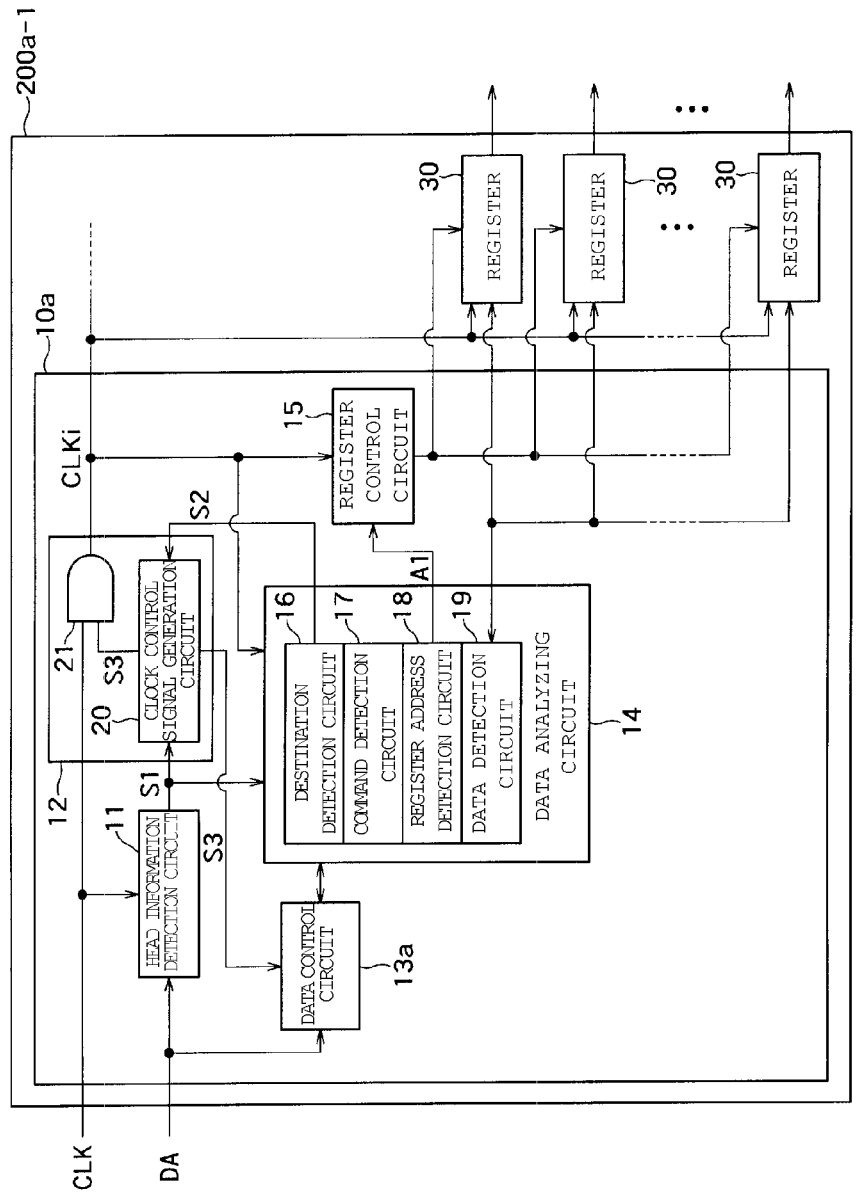
FIG. 6 is a block diagram illustrating a bus interface circuit of a slave device according to a second embodiment.

FIG. 6 is a block diagram of a bus interface circuit 10a of a slave device 200a-1 according to the second embodiment. In FIG. 6, the same reference numerals are applied to components common with that of FIG. 2, and hereinafter, differences are mainly described.

The data control circuit 13a buffers the data from data channel DA and outputs the data from the data channel DA to the data analyzing circuit 14 after the head information is detected, and when the destination of the destination information does not match the slave device 200a-1, stops the output of the data from data channel DA to the data analyzing circuit 14 based on the clock control signal S3. When the destination of the destination information matches the destination of the slave device 200a-1, the data control circuit 13a continues the output of the data from the data channel DA based on the clock control signal S3. In this case, when the command instructs the reading, similar to the first embodiment, the data control circuit 13a buffers the data read from the register 30, and supplies the data to the master device 100 through the bus 300.

The data control circuit 13a, for example, may include the AND circuit which outputs the logical product of the data from the data channel DA and the clock control signal S3 to the data analyzing circuit 14.

According to this second embodiment, when the destination of the data channel DA does not match the slave device 200a-1, the output of the data control circuit 13a to the data analyzing circuit 14 is stopped, and thus it is possible to reduce current consumption and noise of the data control circuit 13a. Accordingly, it is possible to further reduce current consumption and noise of the bus interface circuit 10a, as compared to the first embodiment.

Furthermore, in the first and the second embodiments, an example where the bus interface circuits 5, 10, and 10a are based on the interface standard of RFFE is described, but the possible embodiments are not limited thereto, and these interface circuits may be based on other interface standards such as $I^2C$, for example.

In addition, the circuit configurations of the inner clock control circuit 12 and the clock control signal generation circuit 20 described above are examples, and the circuit configurations are not limited thereto.

In addition, the head information may be different from the signal described above insofar as the signal is based on the interface standard. The specific logic value of each signal is not limited to the examples described above, and HIGH and LOW may be reversed in some embodiments.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A bus interface circuit disposed in a slave device that is addressable by a master device, the bus interface circuit comprising:
    a head information detection circuit connected to a common data channel, by which the master device supplies data to a plurality of slave devices connected in parallel, and a clock signal channel, by which the master device supplies a clock signal to the plurality of slave devices, the head information detection circuit being configured to detect head information in data supplied on the common data channel and output a head identification signal indicating whether head information has been detected in the data supplied on the common data channel;
    an inner clock control circuit that generates an inner clock signal that is synchronized to the clock signal in response to the head identification signal indicating head information has been detected; and
    a data analyzing circuit that is synchronized with the inner clock and detects destination information in the data supplied on the common data channel and is configured to output a destination match signal indicating whether a destination in the destination information corresponds to an address of the bus interface circuit, wherein
    the inner clock control circuit is configured to stop outputting the inner clock signal if the destination in the destination information does not match the address of the bus interface circuit.

2. The bus interface circuit according to claim 1, wherein the inner clock control circuit continues outputting the inner clock if the destination corresponds to the address of the bus interface circuit.

3. The bus interface circuit according to claim 1, further comprising:
    a data control circuit that outputs the data from the common data channel to the data analyzing circuit after the head information is detected, and stops outputting the data from the common data channel to the data analyzing circuit when the destination includes the address of the bus interface circuit.

4. The bus interface circuit according to claim 3, wherein the data control circuit continues outputting the data from the common data channel when the destination includes the address of bus interface circuit.

5. The bus interface circuit according to claim 1, wherein the destination information corresponds to two or more slave devices connected to the common data channel.

6. A bus interface circuit for each of a plurality of slave devices, each connected to a data channel and a clock channel supplied from a master device, the bus interface circuit comprising:
    a head information detection circuit that detects head information that is supplied on the data channel to a plurality of slave devices connected in parallel with each other and indicates the head of a data transfer, the head information circuit generating a first signal when the head information is detected;
    a clock control circuit that receives the first signal from the head information detection circuit and, in response to the first signal, generates an internal clock that is synchronous with a clock supplied on the clock channel, and the clock control circuit stopping generation of the internal clock in response to receipt of a second signal; and
    a data analyzing circuit operating with the internal clock, the data analyzing circuit including a destination detection circuit that stores destination information corresponding to a particular bus interface circuit in a particular slave device in the plurality of slave devices, wherein
    the destination detection circuit is configured to detect whether destination data provided on the data channel matches the destination information identifying the particular bus interface circuit and to provide the second signal to the clock control circuit when the detected destination information does not match the destination information identifying the particular bus interface circuit.

7. The bus interface circuit according to claim 6, wherein the data analyzing circuit further includes a plurality of detection circuits for capturing information from the data channel synchronously with the internal clock when the destination detection circuit indicates the detected destination information is a match.

8. The bus interface circuit according to claim 7, wherein the plurality of detection circuits includes a command detection circuit for capturing a command from the data channel.

9. The bus interface circuit according to claim 7, wherein the plurality of detection circuits includes a register address detection circuit for capturing a register address from the data channel.

10. The bus interface circuit according to claim 9, wherein the register address detection circuit generates a control signal when a register address is detected; and the bus interface circuit further comprises a register control circuit that receives the control signal, and in response reads data from or writes data to a particular register addressed by the register address.

11. The bus interface circuit according to claim 7, wherein the plurality of detection circuits includes a data detection circuit for capturing data from the data channel.

12. The bus interface circuit according to claim 6, further comprising a data control circuit connected to the data channel and receiving the internal clock, wherein
the data control circuit captures data from the data channel and provides captured data to the data analyzing circuit synchronously with the internal clock and does not capture or provide captured data to the data analyzing circuit when the internal clock is stopped.

13. The bus interface circuit according to claim 12, wherein the data analyzing circuit includes a plurality of detection circuits for capturing information from the data channel synchronously with the internal clock after the destination circuit indicates the destination information is a match.

14. The bus interface circuit according to claim 13, wherein the plurality of detection circuits includes a command detection circuit for capturing a command from the data channel.

15. The bus interface circuit according to claim 13, wherein the plurality of detection circuits includes a register address detection circuit for capturing a register address from the data channel.

16. The bus interface circuit according to claim 13, wherein the plurality of detection circuits includes a data detection circuit for capturing data from the data channel.

17. A method for operating a bus interface circuit disposed in each slave device of a plurality of slave devices connected in parallel to a master device by a common data channel and a clock channel, the method comprising:
    detecting head information on the common data channel and indicating the detection of head information by outputting a first signal;
    starting an internal clock synchronous to the clock on the clock channel in response to the first signal;
    capturing destination information on the common data channel synchronously with the internal clock, the destination information specifying at least one slave device in the plurality of slave devices connected in parallel to the master device;
    comparing the captured destination information with internal destination information identifying the bus interface of the at least one slave device in the plurality of slave devices to determine whether or not there is a match;
    if there is a match, outputting a control signal for maintaining output of the internal clock and then capturing data from the data channel synchronously with the internal clock; and
    if there is not a match, outputting the control signal stopping the output of the internal clock.

18. The method according to claim 17, wherein capturing data from the common data channel includes detecting a command from the common data channel.

19. The method according to claim 17, wherein capturing data from the common data channel includes detecting a register address from the common data channel.

20. The method according to claim 17, wherein capturing data from the common data channel is performed by a data control circuit operating synchronously with the internal clock.

* * * * *